J. L. ROBERTS.
Corn Planter and Drill.
No. 222,311. Patented Dec. 2, 1879.
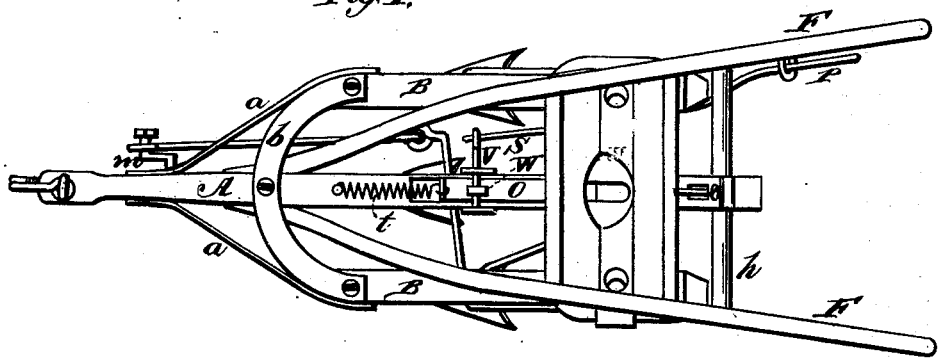
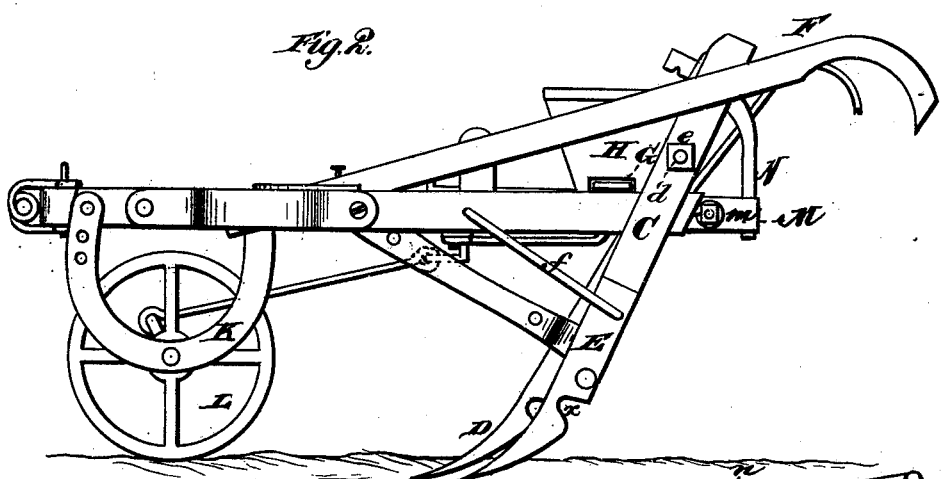
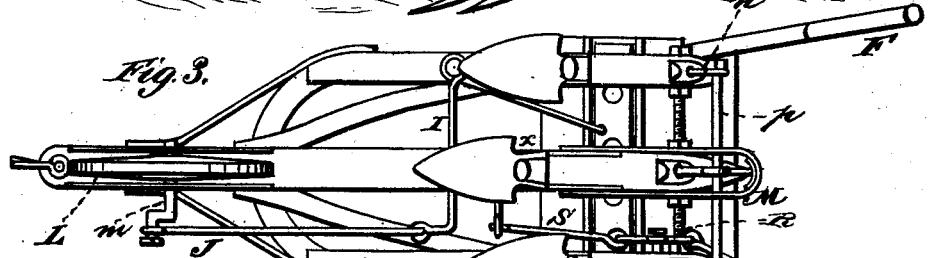
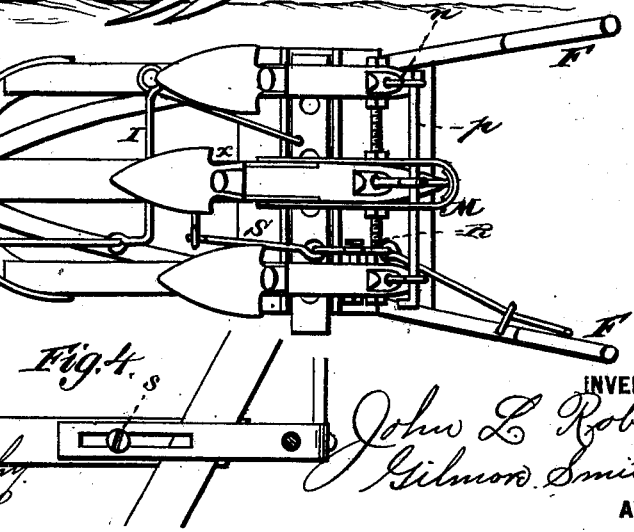
WITNESSES
Robert Everett
James J. Shelby
INVENTOR
John L. Roberts
Gilmore, Smith & Co,
ATTORNEYS

UNITED STATES PATENT OFFICE.

JOHN L. ROBERTS, OF WEST PLAINS, MISSOURI.

IMPROVEMENT IN CORN PLANTERS AND DRILLS.

Specification forming part of Letters Patent No. 222,311, dated December 2, 1879; application filed July 19, 1879.

*To all whom it may concern:*

Be it known that I, JOHN L. ROBERTS, of West Plains, in the county of Howell and State of Missouri, have invented certain new and useful Improvements in Corn Planters and Drills; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a plan of my corn planter and drill. Fig. 2 is a side-elevation view of the same, and Fig. 3 is a bottom view. Fig. 4 is a detail view.

The nature of my invention consists in the construction and arrangement of a wheat-drill, which may be used as a corn-planter also, as will be hereinafter more fully set forth.

The annexed drawings, to which reference is made, fully illustrate my invention.

A represents the center beam, to which are suitably connected two side beams, B B, running parallel with the center beam. These side beams are connected to the center beam by metal straps or braces $a$ $a$ at their front ends, and by a circle brace, $b$, on top, as shown.

On the rear ends of the beams A B are mortised the seed tubes or conductors C C C, the upper ends of which are held rigidly by means of screw-rod $d$ and nuts $e$ on both sides of each tube.

The tubes or conductors C are further strengthened by means of inclined braces $f$, running from their lower ends to their respective beams. Each tube is provided with a plow-point, D, which is formed with a shank, E, in one piece. This shank is bent around the tube or conductor C, and fastened thereto, as shown.

The metal between the shank and point is divided on each side, as shown at $x$, so that as the soil is elevated by the plow-point to said notches $x$ it drops back through the same into the furrow made by the point, and thus covers the grain.

H is the seed-box, placed on the beams in front of the conductors, and held by means of the handles F F. The front ends of these handles are fastened to the center beam, and, extending backward, are let into the ends of the seed-box, and further connected by a round, $h$, passing through the upper end of the center tube.

In the bottom of the seed-box H are suitable seed-openings, and below the same is a slide, G, for conveying the grain from said box to suitable openings in the beams leading into the tubes or conductors C.

The slide G is operated by means of a bell-crank lever, I, and pitman J, the lever being pivoted to the under side of one of the side beams, one arm being connected to the slide, and the other arm, by means of the pitman J, connected with a crank on an axle, $m$, which carries the center wheel, L, and has its bearings in semicircular plates K, attached to and depending from the center beam.

As the machine is drawn forward the wheel L rotates and operates the slide.

In each conductor or tube C is a feed-gage, $n$, and all the gages are connected to a single rod, $p$, which passes through a slotted yoke or stirrup, M, straddling the center tube, and extending along the sides of the center beam, A, guide-pins or screws $s$ being passed through the slots in the stirrup into said beam.

To the stirrup M is attached a curved notched bar, N, which extends through the middle tube, and may be adjusted to set slides or gages $n$, for regulating the feed of the wheat.

When desired to drop corn, the wheat-drilling mechanism is removed, and a corn-slide, O, placed on the beam, with a spring, $t$, drawing the same forward.

To one of the handles F is connected a rod, P, the lower end of which is, by an elbow-lever, R, and rod S, connected with a crank-shaft, V, having its bearings in suitable standards above the center beam. To this shaft is attached an arm, W, the end of which enters a hole in the slide O, so that by pulling on the rod P the slide will be moved backward, and the spring $t$ will move it forward again.

I claim—

The plow-point D, made in one piece with the bent shank E, and forming a notch or opening, $x$, on each side, in combination with the tube C, as and for the purposes herein set forth.

In testimony that I claim the above I have hereunto subscribed my name in the presence of two witnesses.

JOHN L. ROBERTS.

Witnesses:
 A. J. RICE,
 D. C. GALLOWAY.